(12) United States Patent
Zhang

(10) Patent No.: US 9,219,803 B2
(45) Date of Patent: Dec. 22, 2015

(54) HOUSING AND ELECTRONIC DEVICE USING THE SAME

(71) Applicants: SHENZHEN FUTAIHONG PRECISION INDUSTRY CO., LTD., Shenzhen (CN); FIH (Hong Kong) Limited, Kowloon (HK)

(72) Inventor: Chun-Jie Zhang, Shenzhen (CN)

(73) Assignees: SHENZHEN FUTAIHONG PRECISION INDUSTRY CO., LTD., Shenzhen (CN); FIH (Hong Long) Limited, Kowloon (HK)

( * ) Notice: Subject to any disclaimer, the term of this patent is extended or adjusted under 35 U.S.C. 154(b) by 372 days.

(21) Appl. No.: 13/914,923

(22) Filed: Jun. 11, 2013

(65) Prior Publication Data

US 2014/0204508 A1 Jul. 24, 2014

(30) Foreign Application Priority Data

Jan. 23, 2013 (CN) .......................... 2013 1 0024513

(51) Int. Cl.
*H04M 1/00* (2006.01)
*C03C 25/10* (2006.01)
*H04M 1/02* (2006.01)
*A45C 11/00* (2006.01)

(52) U.S. Cl.
CPC ............... *H04M 1/00* (2013.01); *C03C 25/106* (2013.01); *A45C 2011/002* (2013.01); *H04M 1/0202* (2013.01); *H04M 1/0283* (2013.01); *Y10T 428/265* (2015.01); *Y10T 428/266* (2015.01)

(58) Field of Classification Search
CPC ... H04M 1/00; H04M 1/0202; H04M 1/0283; C03C 25/106; Y10T 428/265; Y10T 428/266; A45C 2011/002
See application file for complete search history.

(56) References Cited

U.S. PATENT DOCUMENTS

2012/0107536 A1* 5/2012 Li et al. ................... 428/34.6

* cited by examiner

*Primary Examiner* — Michael C Miggins
(74) *Attorney, Agent, or Firm* — Novak Druce Connolly Bove + Quigg LLP

(57) ABSTRACT

A housing includes a substrate, a transition layer disposed on the substrate, and a color layer disposed on the transition layer. The transition layer is a layer of titanium-nitride and M-nitride, wherein the M is chromium, aluminum, or silicon. The color layer is a titanium-aluminum-nitride layer. The color layer provides the appearance of enamel on the exterior of the housing. The transition layer enhances the hardness of the housing. An electronic device using the housing is also described.

18 Claims, 3 Drawing Sheets

HOUSING AND ELECTRONIC DEVICE USING THE SAME

CROSS-REFERENCE TO RELATED APPLICATIONS

This application is related to the U.S. patent applications listed below. The current application and the related applications have the same assignee. The disclosure of each of the applications is incorporated by reference into the other applications.

| Attorney Docket No. | Title | Inventors |
| --- | --- | --- |
| US49631 | HOUSING AND ELECTRONIC DEVICE USING THE SAME | CHUN-JIE ZHANG |
| US50158 | HOUSING AND ELECTRONIC DEVICE USING THE SAME | CHUN-JIE ZHANG |

BACKGROUND

1. Technical Field

The present disclosure relates to housings, especially to a housing having high hardness and an enamel appearance, and an electronic device using the housing.

2. Description of Related Art

Housings of electronic devices may be decorated by paint. However, the paint coating is often thick, has low light transmittance and low glossiness, and thus cannot present an enamel appearance. Furthermore, the paint coatings are typically soft and prone to abrasion.

Therefore, there is room for improvement within the art.

BRIEF DESCRIPTION OF THE DRAWING

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
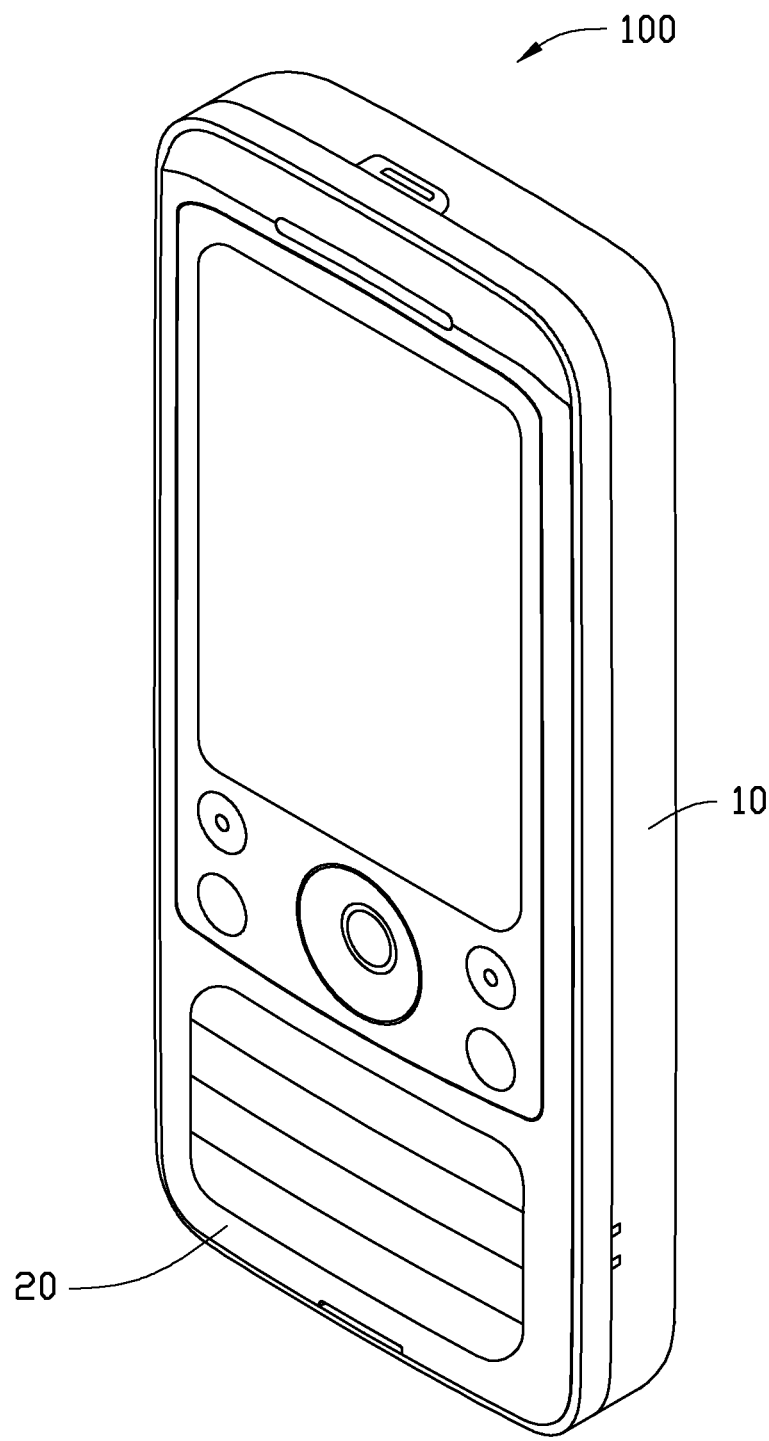
FIG. 1 is a schematic view of an electronic device in accordance with an exemplary embodiment.

FIG. 1 shows an electronic device 100 according to an exemplary embodiment. The electronic device 100 may be a mobile phone, a PDA, or a notebook computer, for example. The exemplary embodiment uses a mobile phone as an example to describe the electronic device 100.

The electronic device 100 includes a housing 10, and a main body 20. The housing 10 is configured to be assembled with the main body 20. Electrical elements and a displaying assembly (not shown) can be received in the main body 20.

Figure 2:
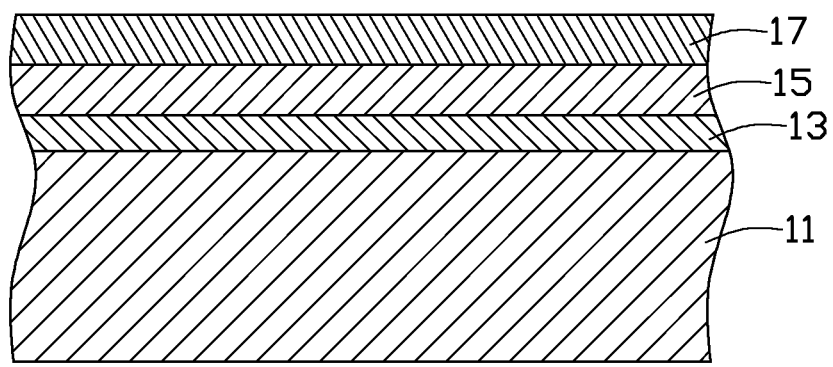
FIG. 2 is a partial cross-sectional view of a housing in accordance with an exemplary embodiment.

Referring to FIG. 2, the housing 10 includes a substrate 11, a base layer 13 formed on the substrate 11, a transition layer 15 formed on the base layer 13, and a color layer 17 formed on the transition layer 15.

The substrate 11 can be made of aluminum, or stainless steel.

The base layer 13 is a metal layer of Ti-M, wherein M is chromium (Cr), aluminum (Al), or silicon (Si). In the base layer 13, Ti has a mass percentage of about 50% to about 60%, and M has a mass percentage of about 40% to about 50%. The base layer 13 has a thickness ranging from about 0.1 micrometers (μm) to about 0.2 μm. When the base layer 13 is a Ti—Cr layer, the Ti has a mass percentage of about 50%, and the Cr has a mass percentage of about 50%. When the base layer 13 is a Ti—Al layer, the Ti has a mass percentage of about 55%, and the Al has a mass percentage of about 45%. When the base layer 13 is a Ti—Si layer, the Ti has a mass percentage of about 60%, and the Si has a mass percentage of about 40%. The base layer 13 firmly bonds the transition layer 15 to the substrate 11.

The transition layer 15 is a layer of titanium nitride (Ti—N) and M-nitride (M-N). The M may be chromium (Cr), aluminum (Al), or silicon (Si). In the transition layer 15, the titanium nitride has a mass percentage of about 50% to about 60%, and the M-nitride has a mass percentage of about 40% to about 50%. In the exemplary embodiment, when the transition layer 15 includes titanium nitride and chromium nitride, the titanium nitride has a mass percentage of about 50%, and the chromium nitride has a mass percentage of about 50%. When the transition layer 15 includes titanium nitride and aluminum nitride, the titanium nitride has a mass percentage of about 55%, and the aluminum nitride has a mass percentage of about 45%. When the transition layer 15 includes titanium nitride and silicon nitride, the titanium nitride has a mass percentage of about 60%, and the silicon nitride has a mass percentage of about 40%. The transition layer 15 has a thickness ranging from about 0.3 μm to about 0.5 μm. The transition layer 15 has a high hardness, which enhances the hardness of the housing 10.

The color layer 17 is a titanium-aluminum-nitride layer which contains titanium nitride phase and aluminum nitride phase. In the color layer 17, the titanium nitride has a mass percentage of about 30% to about 40%, and the aluminum nitride has a mass percentage of about 60% to about 70%. The color layer 17 presents a purple color due to its chemical make-up and thickness. In a first exemplary embodiment, the titanium nitride has a mass percentage of about 40%, and the aluminum nitride has a mass percentage of about 60%. In a second exemplary embodiment, the titanium nitride has a mass percentage of about 35%, and the aluminum nitride has a mass percentage of about 65%. In a third exemplary embodiment, the titanium nitride has a mass percentage of about 30%, and the aluminum nitride has a mass percentage of about 70%. The color layer 17 has a thickness ranging from 0.5 μm to about 0.8 μm. The color layer 17 provides the appearance of enamel on the housing 10.

Vickers hardness tests were performed on the housing 10 and the substrate 11. The tests indicated that the substrate 11 had a Vickers hardness of about 250 HV to about 300 HV, while the housing 10 had a Vickers hardness of about 700 HV to about 850 HV, which is far greater than the Vickers hardness of the substrate 11.

Alternatively, the base layer 13 can be omitted, and the transition layer 15 is directly deposited on the substrate 11.

In the exemplary embodiment, the housing 10 is formed by the following method.

Figure 3:
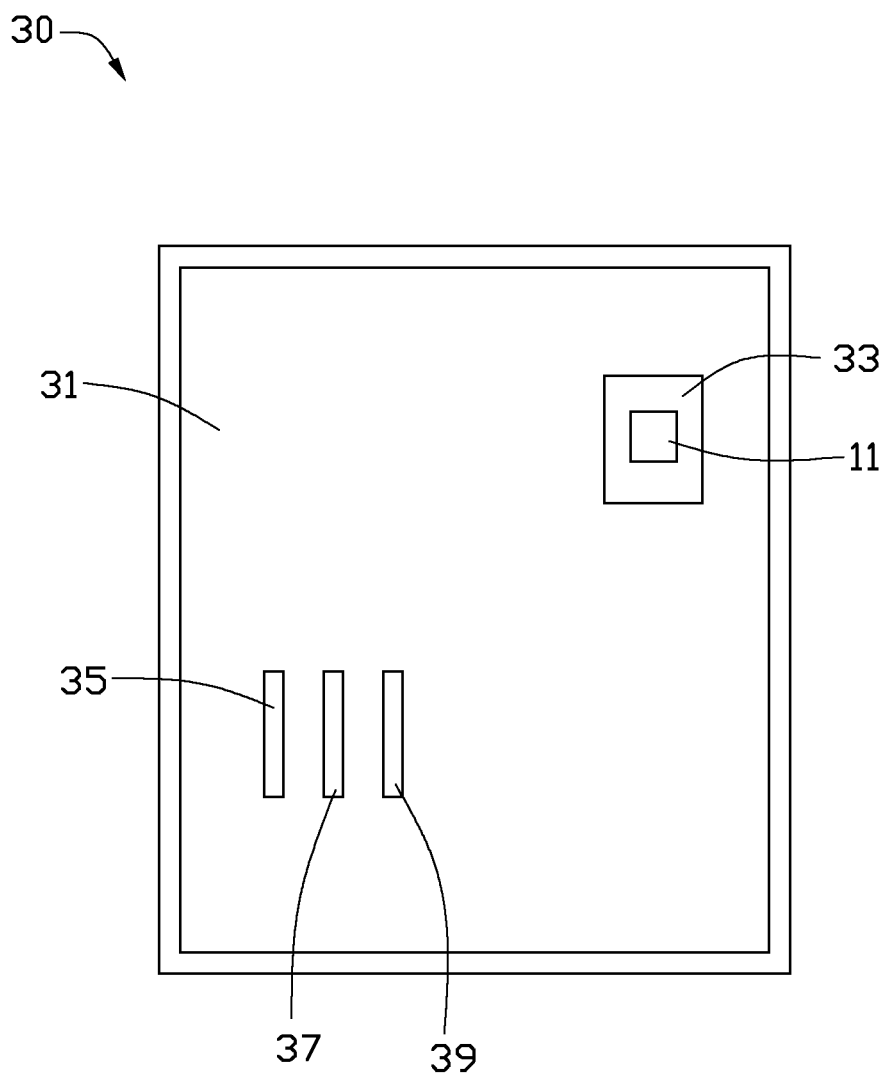
FIG. 3 is a schematic view of a vacuum depositing device in accordance with an exemplary embodiment.

FIG. 3 shows an exemplary vacuum depositing device 30. The vacuum depositing device 30 includes a coating chamber 31, and a fixing element 33, a first target 35, a second target 37, and a third target 39 all positioned in the coating chamber 31. The first target 35 is a titanium target. The second target 37 may be a chromium target, an aluminum target, or a silicon target. The third target 39 contains titanium and aluminum, wherein the titanium has a mass percentage of about 40% to about 50%, and the aluminum has a mass percentage of about 50% to about 60%. The vacuum depositing device 30 may be a magnetron sputtering device, or a multi-arc ion plating device. In the exemplary embodiment, the vacuum depositing device 30 is a magnetron sputtering device.

The substrate 11 is cleaned in an ultrasonic cleaning device (not shown) filled with absolute ethanol for about 25 min to about 35 min.

The substrate 11 is mounted on the fixing element 33. The coating chamber 31 is evacuated to about $3.0 \times 10^{-3}$ Pa and is heated to about 180° C. to about 220° C.

A power of about 3 kW to about 5 kW is applied to the vacuum depositing device 30. Argon gas having a purity of about 99.999% may be used as a working gas and is fed into the coating chamber 31 at a flow rate of about 600 standard-state cubic centimeters per minute (sccm) to about 800 sccm. The argon gas is ionized to plasma. The plasma strikes the surface of the substrate 11 to clean the surface of the substrate 11. Plasma cleaning of the substrate 11 may take about 15 min to about 20 min. The targets in the coating chamber 31 are unaffected by the plasma cleaning process.

The base layer 13 is deposited on the pretreated substrate 11. The first target 35 and the second target 37 are selected. A bias voltage of about −200 V to about −300 V is applied to the substrate 11. Argon gas may be used as a working gas and is fed into the coating chamber 31 at a flow rate of about 100 sccm to about 150 sccm. Depositing of the base layer 13 may take about 5 min to about 10 min.

The transition layer 15 is deposited on the base layer 13. The first target 35 and the second target 37 are selected. A bias voltage of about −250 V to about −300 V is applied to the substrate 11. Argon gas may be used as a working gas and is fed into the coating chamber 31 at a flow rate of about 100 sccm to about 150 sccm. Nitrogen ($N_2$) is used as reaction gas and is fed into the coating chamber 31 at a flow rate of about 30 sccm to about 50 sccm. Depositing of the transition layer 15 may take about 25 min to about 35 min.

The color layer 17 is deposited on the transition layer 15. The third target 39 is selected. A bias voltage of about −300 V to about −350 V is applied to the substrate 11. Argon gas may be used as a working gas and is fed into the coating chamber 31 at a flow rate of about 60 sccm to about 70 sccm. Nitrogen ($N_2$) is used as reaction gas and is fed into the coating chamber 31 at a flow rate of about 150 sccm to about 200 sccm. Depositing of the color layer 17 may take about 35 min to about 45 min.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A housing, comprising:
   a substrate;
   a transition layer disposed on the substrate; and
   a color layer disposed on the transition layer;
   wherein the transition layer is a layer of titanium-nitride and M-nitride, the M being chromium, aluminum, or silicon;
   wherein the color layer is a titanium-aluminum-nitride layer.

2. The housing as claimed in claim 1, wherein in the transition layer, the titanium nitride has a mass percentage of about 50% to about 60%, and the M-nitride has a mass percentage of about 40% to about 50%.

3. The housing as claimed in claim 1, wherein the transition layer has a thickness ranging from about 0.3 μm to about 0.5 μm.

4. The housing as claimed in claim 1, wherein the color layer comprises titanium nitride phase and aluminum nitride phase, the titanium nitride has a mass percentage of about 30% to about 40%, and the aluminum nitride has a mass percentage of about 60% to about 70%.

5. The housing as claimed in claim 1, wherein the color layer has a thickness ranging from 0.5 μm to about 0.8 μm.

6. The housing as claimed in claim 1, wherein the substrate is made of aluminum, or stainless steel.

7. The housing as claimed in claim 1, further comprising a base layer formed between the substrate and the transition layer, the base layer is a metal layer of Ti—M, wherein M is chromium, aluminum, or silicon.

8. The housing as claimed in claim 7, wherein in the base layer, Ti has a mass percentage of about 50% to about 60%, and M has a mass percentage of about 40% to about 50%.

9. The housing as claimed in claim 7, wherein the base layer has a thickness ranging from about 0.1 μm to about 0.2 μm.

10. The electronic device as claimed in claim 1, further comprising a base layer formed between the substrate and the transition layer, the base layer is a metal layer of Ti—M, wherein M is chromium, aluminum, or silicon.

11. The electronic device as claimed in claim 10, wherein in the base layer, Ti has a mass percentage of about 50% to about 60%, and M has a mass percentage of about 40% to about 50%.

12. The electronic device as claimed in claim 10, wherein the base layer has a thickness ranging from about 0.1 μm to about 0.2 μm.

13. An electronic device, comprising:
    a main body; and
    a housing configured to assemble with the main body, the housing comprising:
      a substrate;
      a transition layer disposed on the substrate; and
      a color layer disposed on the transition layer;
      wherein the transition layer is a layer of titanium-nitride and M-nitride, the M being chromium, aluminum, or silicon;
      wherein the color layer is a titanium-aluminum-nitride layer.

14. The electronic device as claimed in claim 13, in the transition layer, the titanium nitride has a mass percentage of about 50% to about 60%, and the M-nitride has a mass percentage of about 40% to about 50%.

15. The electronic device as claimed in claim 13, wherein the transition layer has a thickness ranging from about 0.3 μm to about 0.5 μm.

16. The electronic device as claimed in claim 13, wherein the color layer comprises titanium nitride phase and aluminum nitride phase, the titanium nitride has a mass percentage of about 30% to about 40%, and the aluminum nitride has a mass percentage of about 60% to about 70%.

17. The electronic device as claimed in claim 13, wherein the color layer has a thickness ranging from 0.5 μm to about 0.8 μm.

18. The housing as claimed in claim 10, wherein the substrate is made of aluminum, or stainless steel.

* * * * *